US008508630B2

(12) United States Patent
Umeyama

(10) Patent No.: US 8,508,630 B2
(45) Date of Patent: Aug. 13, 2013

(54) ELECTRONIC CAMERA

(75) Inventor: Kazuya Umeyama, Tokyo (JP)

(73) Assignee: Nikon Corporation, Tokyo (JP)

( * ) Notice: Subject to any disclaimer, the term of this patent is extended or adjusted under 35 U.S.C. 154(b) by 637 days.

(21) Appl. No.: 12/222,956

(22) Filed: Aug. 20, 2008

(65) Prior Publication Data

US 2009/0073290 A1 Mar. 19, 2009

(30) Foreign Application Priority Data

Aug. 22, 2007 (JP) ................ 2007-216361

(51) Int. Cl.
*H04N 9/64* (2006.01)
*H04N 5/225* (2006.01)

(52) U.S. Cl.
USPC ..................... 348/246; 348/207.99

(58) Field of Classification Search
USPC ............ 348/220.1, 222.1, 246–248
See application file for complete search history.

(56) References Cited

U.S. PATENT DOCUMENTS

| | | | |
|---|---|---|---|
| 6,130,420 A | 10/2000 | Tanaka et al. | |
| 6,819,359 B1 | 11/2004 | Oda | |
| 6,970,193 B1 | 11/2005 | Kidono et al. | |
| 7,428,013 B2* | 9/2008 | Tsukagoshi et al. | 348/249 |
| 7,443,430 B2* | 10/2008 | Rengakuji et al. | 348/241 |
| 7,545,420 B2 | 6/2009 | Kondo | |
| 7,728,887 B2* | 6/2010 | Ueda | 348/248 |
| 7,812,801 B2* | 10/2010 | Takane | 345/87 |
| 7,948,531 B2 | 5/2011 | Tanizoe et al. | |
| 2002/0186308 A1 | 12/2002 | Baer | |
| 2004/0169737 A1 | 9/2004 | Udagawa | |
| 2004/0169896 A1* | 9/2004 | Kondo | 358/482 |
| 2005/0264661 A1* | 12/2005 | Kawanishi et al. | 348/248 |
| 2006/0152606 A1 | 7/2006 | Noguchi | |
| 2007/0165120 A1* | 7/2007 | Takane | 348/248 |

FOREIGN PATENT DOCUMENTS

| | | |
|---|---|---|
| CN | 1672403 A | 9/2005 |
| JP | A-57-133776 | 8/1982 |
| JP | A-02-295291 | 12/1990 |
| JP | A-6-268922 | 9/1994 |
| JP | A-8-88803 | 4/1996 |
| JP | A-10-304250 | 11/1998 |
| JP | A-2000-350032 | 12/2000 |
| JP | A-2001-024943 | 1/2001 |
| JP | A-2001-86413 | 3/2001 |
| JP | A-2003-114461 | 4/2003 |
| JP | A-2003-116057 | 4/2003 |
| JP | A-2003-338979 | 11/2003 |
| JP | A-2004-260699 | 9/2004 |
| JP | A-2005-039463 | 2/2005 |
| JP | A-2006-094474 | 4/2006 |
| JP | A-2006-157341 | 6/2006 |
| JP | A-2006-186423 | 7/2006 |
| JP | A-2009-044319 | 2/2009 |

OTHER PUBLICATIONS

Aug. 25, 2011 Office Action issued in Chinese Patent Application No. 200810144561.3 (with translation).
Jan. 31, 2012 Office Action issued in Japanese Patent Application No. 2007-216361 (with translation).
Jul. 2, 2012 Office Action issued in Chinese Application No. 200810144561.3 (with English translation).
Sep. 6, 2011 Search Report issued in European Patent Application No. 08162710.1.

* cited by examiner

*Primary Examiner* — Trung Diep
(74) *Attorney, Agent, or Firm* — Oliff & Berridge, PLC

(57) ABSTRACT

An electronic camera includes: an image sensor having a charge transfer unit that transfers an electric charge for each pixel column; a correction unit that corrects an electric charge signal outputted from the charge transfer unit using a correction coefficient; and a control unit that controls the correction unit so that the correction coefficient is different according to operational conditions of the image sensor.

15 Claims, 3 Drawing Sheets

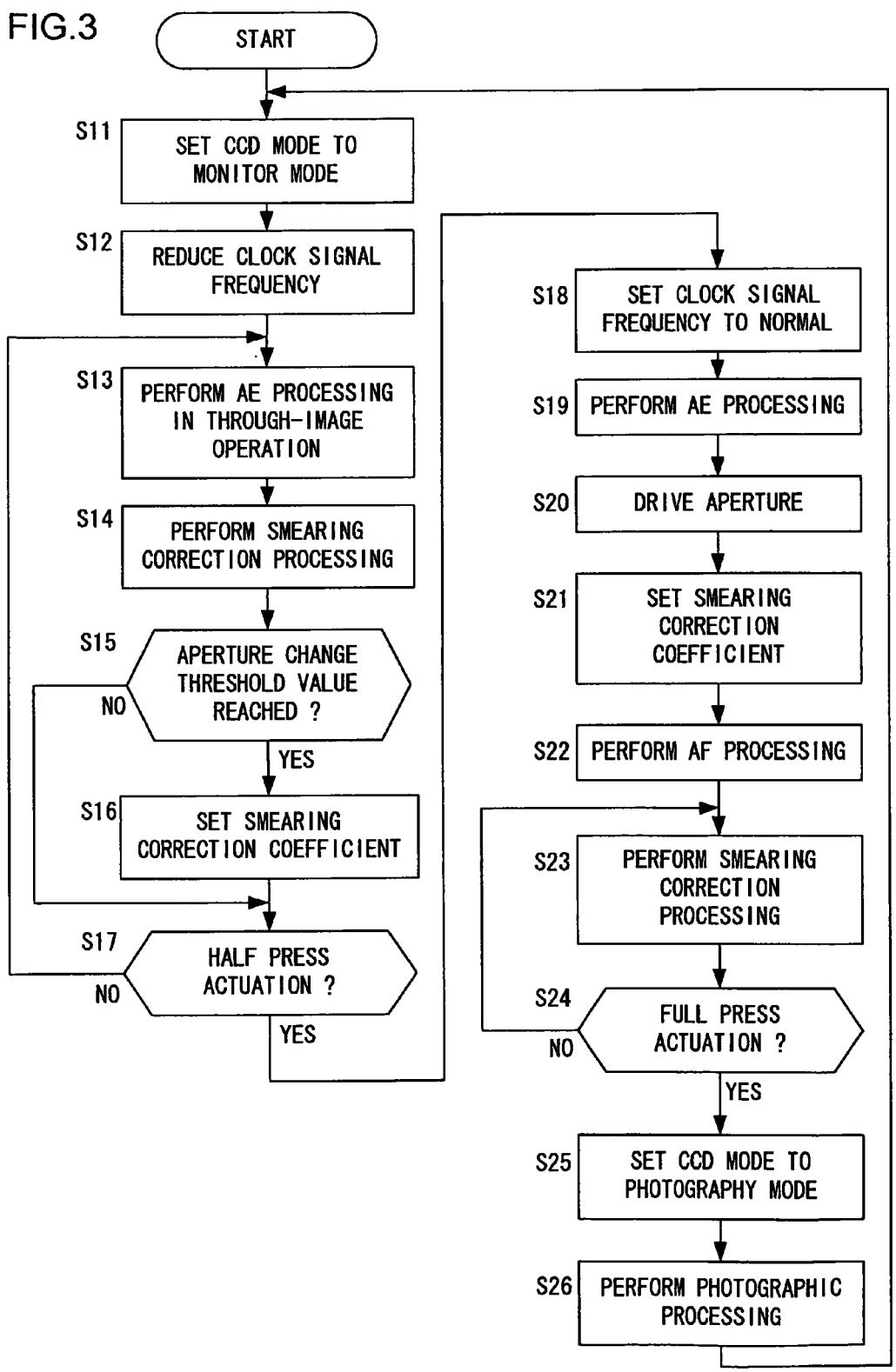

ELECTRONIC CAMERA

INCORPORATION BY REFERENCE

The disclosure of the following priority application is herein incorporated by reference: Japanese Patent Application No. 2007-216361 filed Aug. 22, 2008.

BACKGROUND OF THE INVENTION

1. Field of the Invention

The present invention relates to an electronic camera.

2. Description of Related Art

With a CCD image sensor the so called smearing phenomenon is known, in which electric charges are generated at regions that are adjacent to pixels upon which the amount of incident light is great due to high luminance, and the electric charges that are generated at these electric charge generation regions are added to electric charges that are transferred through the electric charge generation regions. Since this smearing can become a cause for deterioration of the image quality, correction processing is performed in order to alleviate this deterioration of the image quality (refer to Japanese Laid-Open Patent Publication H06-268922).

On the other hand, a technique is known in which an aperture or an ND filter is used as a means for limiting the amount of light incident upon the camera (refer to Japanese Laid-Open Patent Publication 2003-114461). When performing photography with a camera such as a video camera that is not equipped with an auto iris but that is equipped with an ND filter, exposure control during photography is performed in the following manner. That is, a control exposure without use of the ND filter is calculated, and, if the luminance of the photographic subject is high so that the shutter speed reaches its control limit towards the high luminance side, then the camera is changed over to use of the ND filter

SUMMARY OF THE INVENTION

The state of smearing in the case in which a pixel-addition signal is outputted from the image sensor, and the state of smearing in the case in which aperture control is performed as described above, are different from one another. According to the prior art technique, there is the problem that it is not possible to provide correction according to the state of smearing.

According to the 1st aspect of the present invention, an electronic camera comprises: an image sensor having a charge transfer unit that transfers an electric charge for each pixel column; a correction unit that corrects an electric charge signal outputted from the charge transfer unit using a correction coefficient; and a control unit that controls the correction unit so that the correction coefficient is different according to operational conditions of the image sensor.

According to the 2nd aspect of the present invention, in the electronic camera according to the 1st aspect, it is preferred that: the electronic camera further comprises an actuation member that generates a first signal that commands a start of photography using the image sensor, and a second signal before the start of photography is commanded; and the control unit controls the correction unit so as to make the correction coefficient be different before and after the second signal is generated.

According to the 3rd aspect of the present invention, in the electronic camera according to the 2nd aspect, it is preferred that the correction unit corrects the electric charge signal before the first signal is generated.

According to the 4th aspect of the present invention, in the electronic camera according to the 1st aspect, it is preferred that: the electronic camera further comprises a light reduction unit that is changed over between reducing and not reducing a light from a photographic subject that is conducted to the image sensor; and the control unit controls the correction unit so as to make the correction coefficient be different when light reduction is being performed, and when light reduction is not being performed.

According to the 5th aspect of the present invention, in the electronic camera according to the 1st aspect, it is preferred that: the electronic camera further comprises a signal supply unit that supplies a timing signal to the image sensor; and the control unit controls the correction unit so as to make the correction coefficient vary according to a frequency of the timing signal supplied by the signal supply unit.

According to the 6th aspect of the present invention, in the electronic camera according to the 5th aspect, it is preferred that: the electronic camera further comprises an actuation member that generates a first signal that commands a start of photography, and a second signal before the start of photography start is commanded; and the signal supply unit sets a frequency of a signal that is supplied before the second signal is generated to be lower than a frequency of a signal that is supplied after the second signal is generated.

According to the 7th aspect of the present invention, in the electronic camera according to the 5th aspect, it is preferred that: the electronic camera further comprises a light reduction unit that is changed over between reducing and not reducing a light from a photographic subject that is conducted to the image sensor; and the control unit controls the correction unit so as to make the correction coefficient be different when light reduction is being performed, and when light reduction is not being performed.

According to the 8th aspect of the present invention, in the electronic camera according to the 7th aspect, it is preferred that the light reduction unit is controlled so as to set a threshold value for brightness at which changeover is performed from not performing light reduction to performing light reduction when a frequency of the timing signal supplied by the signal supply unit is low, to be lower than a threshold value for brightness at which changeover is performed from not performing light reduction to performing light reduction when the frequency of the timing signal supplied by the signal supply unit is high.

According to the 9th aspect of the present invention, in the electronic camera according to the 2nd aspect, it is preferred that: the actuation member is a shutter release button; and the first signal is a signal that is generated by full press actuation of the shutter release button, and the second signal is a signal that is generated by half press actuation of the shutter release button.

According to the 10th aspect of the present invention, in the electronic camera according to the 6th aspect, it is preferred that: the actuation member is a shutter release button; and the first signal is a signal that is generated by full press actuation of the shutter release button, and the second signal is a signal that is generated by half press actuation of the shutter release button.

According to the 11th aspect of the present invention, a smearing correction method with an electronic camera comprises: determining operational conditions of an image sensor; and making a correction amount for smearing correction of a charge signal outputted from the image sensor vary according to the operational conditions of the image sensor that have been detected.

According to the 12th aspect of the present invention, in the smearing correction method with an electronic camera according to the 10th aspect, it is preferred that the operational conditions of the image sensor are at least one of whether or not an amount of light incident upon the image sensor is being limited, whether a frequency of a clock signal being supplied to the image sensor is high or low, and whether or not a shutter release button has already been half press actuated.

According to the 13th aspect of the present invention, in the smearing correction method with an electronic camera according to the 10th aspect, it is preferred that the charge signal outputted from the image sensor is used for displaying a monitor image upon a display unit that is provided to the electronic camera.

BRIEF DESCRIPTION OF THE DRAWINGS

FIG. 3 is a flow chart for explanation of the flow of processing of this camera when a main CPU starts.

DESCRIPTION OF THE PREFERRED EMBODIMENTS

Figure 1:
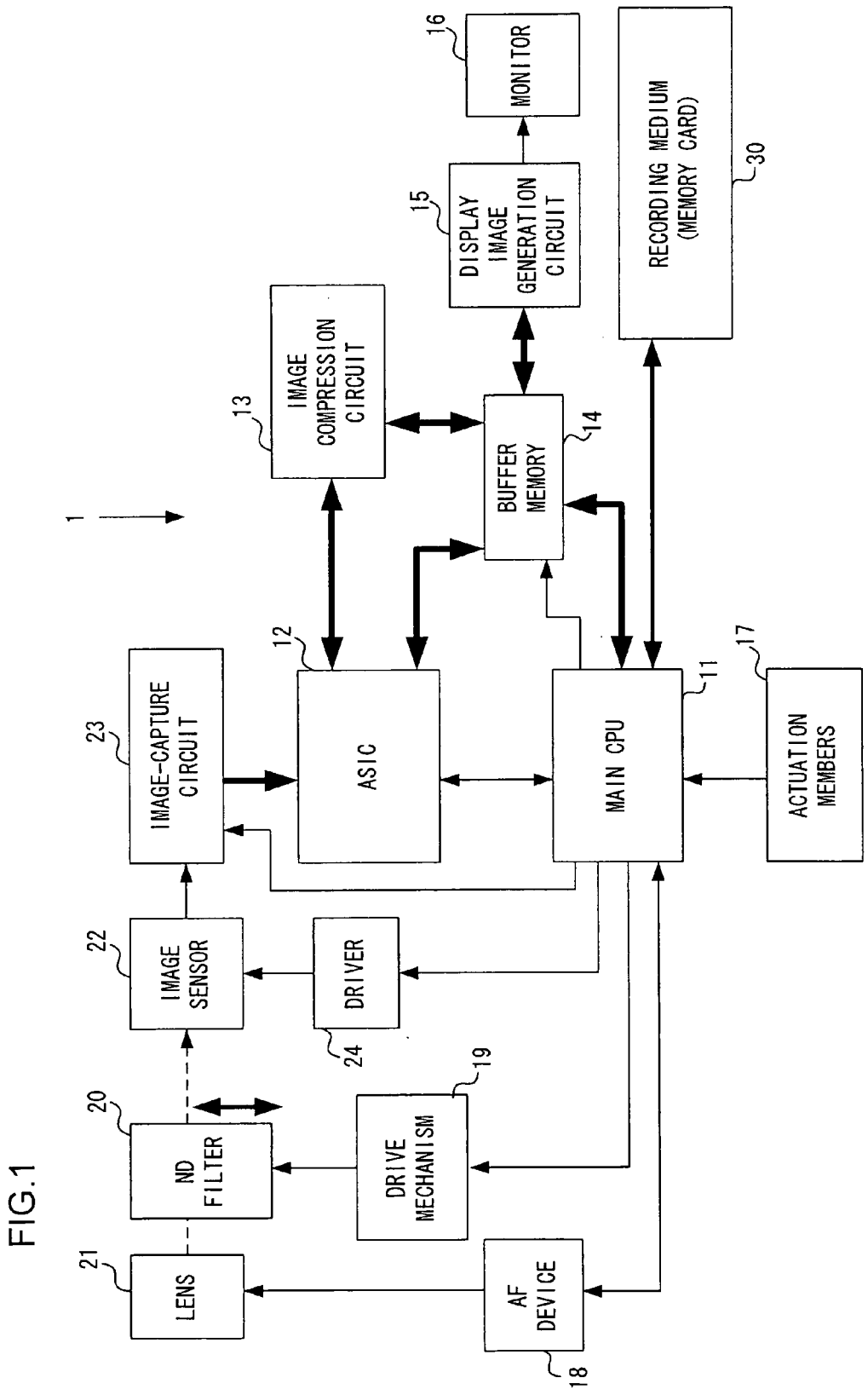
FIG. 1 is a block diagram explaining the structure of the principal portions of an electronic camera according to an embodiment of the present invention.

In the following a preferred embodiment for implementation of the present invention will be explained with reference to the drawings. FIG. 1 is a block diagram explaining the structure of the principal portions of an electronic camera according to an embodiment of the present invention. This electronic camera 1 is controlled by a main CPU 11.

The photographic lens 21 images an image of the photographic subject upon the photographic image surface of the image sensor 22. The image sensor 22 consists of a CCD image sensor or the like that has a charge transfer unit for each column of pixels, and captures an image of the photographic subject upon its photographic image surface and outputs an image capture signal to an image-capture circuit 23. This image sensor 22 can capture a still image on a single shot basis, also can capture a sequence of still images by continuous shooting, and also can capture a movie image.

An ND (Neutral Density) filter 20 is a light reduction member that attenuates the light transmitted through it by a predetermined amount (for example, corresponding to two steps in apex value). The ND filter 20 is driven forwards and backwards by a drive mechanism 19 along a direction that is orthogonal to the optical axis of the photographic lens 21. When the ND filter 20 is driven so as to be inserted upon the optical path of the light from the photographic subject, then the amount of light that is incident upon the image sensor 22 is limited by the ND filter 20. On the other hand, when the ND filter 20 is driven so as to be retracted away from the optical path of the light from the photographic subject, then the amount of light that is incident upon the image sensor 22 is not thus limited. The drive mechanism 19 performs forward and backward driving of the ND filter according to commands from the main CPU 11. It should be understood that, in this embodiment, the case in which the ND filter 20 is used will be termed "small aperture (narrow aperture)", while the case in which the ND filter 20 is not used will be termed "open aperture (wide aperture)".

The image-capture circuit 23 changes its image capture sensitivity (its exposure sensitivity) by predetermined steps within a predetermined range (that may, for example, correspond to ISO 100~ISO 800) according to sensitivity change commands from the main CPU 11. This image capture sensitivity means a detection sensitivity for electric charge accumulated upon the image sensor 22, or a control amount by which the amplification gain of an amplification circuit not shown in the figures is changed. The image capture sensitivity value is expressed as an ISO speed value. And, upon a photography command from the main CPU 11, the photographic circuit 23 also converts the analog image-capture signal into digital data by using an internal A/D conversion circuit.

A driver 24 generates a clock signal according to a command issued from the main CPU 11. Using the clock signal described above, the driver 24 also generates a drive signal for making the image sensor 22 accumulate electric charge and for discharging this accumulated electric charge, and supplies this generated drive signal to the image sensor 22. The clock signal is adapted to be freely changed over between a normal clock signal and a reduced frequency clock signal, so that the frequency of the drive signal that is supplied to the image sensor 22 can be changed.

According to a command from the main CPU 11, an AF device 18 detects the focus adjustment state of the photographic lens 21, and, according to the result of this detection, drives a focusing lens, not shown in the figures but included in the photographic lens 21, forwards and backwards along the direction of the optical axis.

The main CPU 11 inputs the signals that are outputted from the various blocks and performs predetermined calculations upon them, and outputs control signals to the various blocks based upon the results of these calculations. An image processing circuit 12 may consist of, for example, an ASIC, and performs image processing upon the digital image signal inputted from the image-capture circuit 23. In this image processing, for example, there may be included processing for contour reinforcement or for color temperature adjustment (white balance adjustment), and format conversion processing upon the image signal.

An image compression circuit 13 performs image compression processing by the JPEG method at a predetermined compression ratio upon the image signal after it has been processed by the image processing circuit 12. And a display image generation circuit 15 creates display data for displaying the captured image upon a liquid crystal monitor 16.

A recording medium 30 consists of a memory card or the like that can be fitted to and removed from the electronic camera 1. According to commands from the main CPU 11, image files including data for photographic images and information relating thereto are recorded upon this recording medium 30. The image files that are recorded upon the recording medium 30 can be read out according to commands from the main CPU 11.

A buffer memory 14, in addition to temporarily storing data before and after image processing and during image processing, also is used for storing image files before they are recorded upon the recording medium 30 and image files that have been read out from the recording medium 30.

Actuation members 17 include various types of buttons and switches for the electronic camera 1, and actuation signals are outputted to the main CPU 11 according to the details of actuation of these actuation members 17, such as half press actuation and full press actuation of a shutter release button, changeover actuation of a function setting switch, and so on.

<Photographic Operation>

When the electronic camera 1 is changed over to the photographic mode, the main CPU 11 displays a monitor image upon the liquid crystal monitor 16 (also termed a through image or live view). In concrete terms, the CPU 11 causes the image sensor 22 to perform image capture for monitoring, causes the image processing circuit 12 to perform signal processing using the image capture signal outputted by the image sensor 22 after charge accumulation, and causes the display image generation circuit 15 to output the image data after this signal processing. By repeating these operations, monitor images are sequentially displayed upon the liquid crystal monitor 16. The main CPU 11 further performs exposure calculation based upon brightness information that it has acquired from the signal values of the image capture signal, and determines upon exposure conditions and a smearing correction coefficient.

When an actuation signal that indicates half press actuation of the release button (not shown in the figures) is inputted from the actuation members 17, then the main CPU 11 causes photometry to be started. In concrete terms, the main CPU 11 causes the image sensor 22 to perform image capture for photometry, and acquires brightness information for the photographic field from the signal values of the image capture signal that is outputted after charge accumulation. And the main CPU 11 further performs exposure calculation based upon this brightness information, and determines upon exposure conditions and the smearing correction coefficient. And the CPU 11 causes the liquid crystal monitor to display the monitor image after half press actuation by causing the image processing circuit 12 to perform signal processing upon the image capture signal, and by causing the image data after this signal processing to be displayed upon the liquid crystal monitor 16.

And, when an actuation signal that indicates full press actuation of the release button (not shown in the figures) is inputted from the actuation members 17, then the main CPU 11 causes photographic operation to be started. In concrete terms, the main CPU 11 causes the image sensor 22 to accumulate electric charge for photographic according to the exposure conditions that have been determined upon as described above. And, when the image processing circuit 12 outputs image data upon which signal processing has been performed to the display image generation circuit 15, the photographed image is displayed upon the liquid crystal monitor 16. Moreover, after being compressed by the compression circuit 13, the image data is recorded upon the recording medium 30.

Since the electronic camera 1 of this embodiment is distinguished by being endowed with smearing correction, the further explanation thereof will concentrate upon this feature. In this explanation, the aperture state of the camera may be classified into three states.

[State #1]
A state in which the aperture when acquiring a monitor image, the aperture when the release button (not shown in the figures) is half press actuated, and the aperture when the release button (not shown in the figures) is full press actuated, are all set to small (narrow) (i.e. the ND filter 20 is inserted upon the optical path).

[State #2]
A state in which the aperture when acquiring a monitor image is set to small (narrow) (i.e. the ND filter 20 is inserted upon the optical path), while the aperture when the release button (not shown in the figures) is half press actuated and the aperture when the release button (not shown in the figures) is full press actuated are both set to open (wide) (i.e. the ND filter 20 is retracted from the optical path).

[State #3]
A state in which the aperture when acquiring a monitor image, the aperture when the release button (not shown in the figures) is half press actuated, and the aperture when the release button (not shown in the figures) is full press actuated, are all set to open (wide) (i.e. the ND filter 20 is retracted from the optical path).

Figure 2:
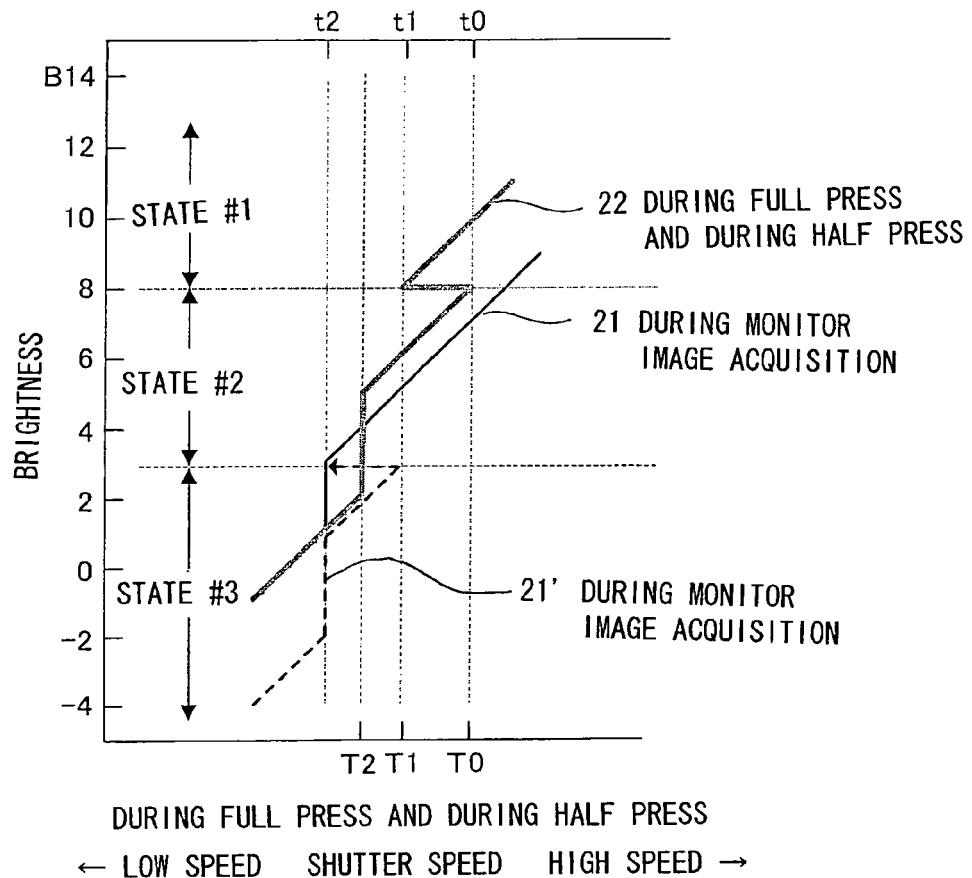
FIG. 2 is a program chart showing an example of exposure control with this electronic camera.

FIG. 2 is a program chart showing an example of exposure control of this electronic camera 1. In FIG. 2, the luminance of the photographic subject (i.e. the brightness of the photographic field) is shown along the vertical axis, with high luminance towards the upper side and low luminance towards the lower side. And the shutter speed that is determined is shown along the horizontal axis, with high speed towards the right side and low speed towards the left side. The scale along the horizontal axis at the top of the figure is a scale for explaining the shutter speed during acquisition of the monitor image. The scale along the horizontal axis at the bottom of the figure is a scale for explaining the shutter speed during photography (i.e. during full press actuation) and during half press actuation. The line 21 shows an example of the control during acquisition of the monitor image, while the line 22 shows an example of the control during photography and during half press actuation. It should be understood that the broken portion of the line 21 will be described hereinafter.

When set to the program auto mode, the main CPU 11 determines the shutter speed, the aperture value, and the sensitivity automatically according to the brightness of the photographic field. For the aperture value, two alternative values are chosen, according as to whether the ND filter 20 is inserted into the optical path or is retracted therefrom. The shutter speed corresponds to the charge accumulation time period of the image sensor 22 (i.e. its exposure time period), and this charge accumulation time period of the image sensor 22 is controlled according to the so called electronic shutter method.

<During Acquisition of the Monitor Image>

In the range of brightness from B(−4) to B3, the main CPU 11 calculates the shutter speed so that an appropriate exposure is obtained in the open aperture state, and obtains a control value as shown by the broken line 21'. Thus, the broken line portion 21' shows the control during open aperture. Here, in the range B(−2) to B1, the shutter speed is kept at t2, and the image capture sensitivity is changed according to the brightness.

When the brightness is greater than B3, then the main CPU 11 sends a command to the drive mechanism 19, and shifts the ND filter 20 into the optical path along with the light from the photographic subject that is conducted to the image sensor 22. Due to this, the amount of light that is incident upon the image sensor 22 is decreased by an amount equivalent to two steps in apex value, as compared to its level during open aperture. And, if the brightness is greater than B3, then the main CPU 11 calculates the shutter speed so as to obtain the appropriate exposure in the above described small aperture state, and obtains a control value as shown by the line 21 (the solid line).

It should be understood that, if the brightness progressively decreases in the range B3~B1, then the shutter speed is maintained at t2 (as shown by the solid line 21), and the image capture sensitivity is changed according to the brightness. If the brightness decreases below B1, then, along with controlling the aperture to open aperture, the image capture sensitivity is controlled two steps lower at the timing of this control to open aperture.

<Upon Half Press Actuation and Full Press Actuation>

In the range of brightness from B(−1) to B8, the main CPU 11 calculates the shutter speed so as to obtain an appropriate exposure in the open aperture state, and obtains a control value as shown by the line 22. Here, in the range from B2 to B5, the shutter speed is maintained at T2, and the image capture sensitivity is changed according to the brightness.

When the brightness is greater than B8, then the main CPU 11 sends a command to the drive mechanism 19, and performs control to small aperture. Due to this, the amount of light that is incident upon the image sensor 22 is decreased by an amount equivalent to two steps in apex value, as compared to its level during open aperture. And, if the brightness is greater than B8, then the main CPU 11 calculates the shutter speed so as to obtain the appropriate exposure in the above described small aperture state, and obtains a control value as shown by the line 22.

FIG. 3 is a flow chart for explanation of the flow of processing in this electronic camera 1 that the main CPU 11 starts when the camera is changed over to the photography mode. In a step S11 of FIG. 3, the main CPU 11 sends a command to the driver 24 to set the CCD mode to the monitor mode, and then the flow of control proceeds to a step S12. In concrete terms, the CPU 11 changes over the control of the image sensor 22 to a mode in which it performs pixel addition, so that the image sensor 22 outputs a signal of a number of pixels that corresponds to the display resolution of the liquid crystal monitor 16.

In the step S12, the main CPU 11 sends a command to the driver 24 and reduces the clock rate that is supplied to the image sensor 22 (for example, sets this clock rate to half of its signal frequency fat normal times) (i.e. performs clock speed reduction (clock down)), and then the flow of control proceeds to a step S13. In the step S13, the main CPU 11 performs AE processing in through-image operation, and then the flow of control proceeds to a step S14. This AE processing in through-image operation is processing to control the exposure based upon brightness information acquired from the value of the image capture signal for monitoring.

In the step S14, the main CPU 11 causes the image processing circuit 12 to start smear correction processing, and then the flow of control proceeds to a step S15. In concrete terms, the CPU 11 calculates the leakage charge amount x for each pixel column in the image-capture signal for monitoring. This leakage charge amount is acquired by using the signal value from an OB (optical black) portion of the image sensor 22. By multiplying this leakage charge amount x by a predetermined coefficient y (a smearing correction coefficient), the main CPU 11 obtains a correction amount $z=x \cdot y$ for each pixel column. When processing to subtract this correction amount z from the image-capture signal value for monitoring is performed for each pixel column, a monitor image signal after smearing amendment is obtained. It should be understood that the value y0 that is substituted for the predetermined coefficient y in this step is a value that is suitable for open aperture during clock signal frequency reduction, and is stored in advance in the main CPU 11.

In the step S15, the main CPU 11 decides whether or not the aperture change threshold value is reached. In other words the main CPU 11 follows the line 21 of FIG. 2, and, if the brightness is greater than B3, reaches an affirmative decision in this step S15 and proceeds to a step S16. And, if the brightness is darker than B3, then the main CPU 11 reaches a negative decision in this step S15 and transfers the flow of control to a step S17.

In the step S16, the main CPU 11 sets the smearing correction coefficient y to a value y1 that is suitable for small aperture, and then the flow of control proceeds to a step S17. The main CPU 11 further issues a command to the drive mechanism 19, and performs control to small aperture. It should be understood that this predetermined coefficient y1 that is suitable to small aperture when the frequency of the clock signal has been reduced is stored in advance within the main CPU 11.

In the step S17, the main CPU 11 makes a decision as to whether or not the release button (not shown in the figures) has been half press actuated. If a signal that indicates half press actuation has been received from the actuation members 17, then the main CPU 11 reaches an affirmative decision in this step S17 and the flow of control proceeds to a step S18. On the other hand, if no signal that indicates half press actuation has been received from the actuation members 17, then the main CPU 11 reaches a negative decision in this step S17, and the flow of control returns to the step S13.

In the step S18, the main CPU 11 sends a command to the driver 24 and raises the frequency of the clock signal that is supplied to the image sensor 22 (i.e. it returns this clock signal frequency to its value f during normal times), and then the flow of control proceeds to a step S19. In this step S19, the main CPU 11 performs AE processing, and then the flow of control proceeds to a step S20. This AE processing is processing to control the exposure based upon the brightness information that was acquired from the value of the image capture signal for photometry.

In the step S20, the main CPU 11 controls to drive the aperture according to the line 22 of FIG. 2, and then the flow of control proceeds to a step S21. In this step S21, the main CPU 11 sets the smearing correction coefficient y to a value (y2 or y3) that is appropriate for the aperture state, and then the flow of control proceeds to a step S22. It should be understood that the predetermined coefficient y2 that is suitable for open aperture with a normal clock signal, and the predetermined coefficient y3 that is suitable for small aperture with a normal clock signal, are both stored within the main CPU 11.

In the step S22, the main CPU 11 performs AF (automatic focus adjustment) processing, and then the flow of control proceeds to a step S23. In this step S23, the main CPU 11 causes the image processing circuit 12 to start smearing correction processing, and then the flow of control proceeds to a step S24. The smearing correction processing in this case is correction processing that is suitable for the photographic mode, n which the image sensor 22 is outputting a signal that has the number of pixels required for photography, and the sequence of processing is the same as that explained above in connection with the step S14.

In the step S24, the main CPU 11 makes a decision as to whether or not the release button (not shown in the figures) has been full press actuated. If a signal that indicates full press actuation has been received from the actuation members 17, then the main CPU 11 reaches an affirmative decision in this step S17 and the flow of control proceeds to a step S25. On the other hand, if no signal that indicates full press actuation has been received from the actuation members 17, then the main CPU 11 reaches a negative decision in this step S24, and the flow of control returns to the step S23.

In the step S25, the main CPU 11 sends a command to the driver 24 to set the CCD mode to the photographic mode, and then the flow of control proceeds to a step S26. The photographic mode differs from the monitor mode, by the aspect that pixel addition is not performed. In the step S26 the main CPU 11 performs photographic processing, and then the flow of control returns to the step S11.

According to the embodiment explained above, the following beneficial operational effects may be obtained.

(1) During monitor image acquisition when the clock rate is low (reduced clock signal frequency), since it is arranged to perform control to the small aperture state where the luminance is lower than when the clock rate is high (normal clock signal), accordingly the amount of light that is incident upon the image sensor 22 is suppressed, so that it is possible to reduce the frequency of occurrence of smearing.

(2) It is arranged to perform smearing correction processing automatically in the step S14 before half press actuation (in other words during acquisition of a monitor image), and in the step S23 after half press actuation. By performing smearing correction processing automatically in this manner without any actuation by the photographer being required for smearing correction, a camera is obtained that has good convenience of use.

(3) With regard to the smearing correction coefficient during monitor image acquisition, it is arranged to separate this into the use of the value y0 that is suitable for the open aperture state when the clock frequency is reduced, and the use of the value y1 that is suitable for the small aperture state when the clock frequency is reduced. By doing this, it is possible to perform appropriate smearing correction in which there is no excess or shortage of correction, even if the relationship between the leakage charge amount of the image sensor 22 and the amount of smearing is different due to the fact that the amount of light that is incident upon the image sensor 22 is different by two steps in apex value between the open aperture state and the small aperture state.

(4) It is arranged to use a smearing correction coefficient (y0 or y1) before half press actuation (in other words during acquisition of a monitor image) that is different from the smearing correction coefficient (y2 or y3) after half press actuation. By doing this, it is possible to perform appropriate smearing correction in which there is no excess or shortage of correction, even if the relationship between the leakage charge amount of the image sensor 22 and the amount of smearing is different due to the difference in the charge accumulation period of the image sensor 22, that originates in the fact that the clock rates are different.

(5) With regard to the smearing correction coefficient after half press actuation, it is arranged to separate this into the use of the value y2 that is suitable for the open aperture state when the clock frequency is normal, and the use of the value y3 that is suitable for the small aperture state when the clock frequency is normal. By doing this, it is possible to perform appropriate smearing correction in which there is no excess or shortage of correction, even if the relationship between the leakage charge amount of the image sensor 22 and the amount of smearing is different due to the fact that the amount of light that is incident upon the image sensor 22 is different by two steps in apex value between the open aperture state and the small aperture state.

(6) As described above, with the electronic camera 1 of this embodiment, the operational conditions of the image sensor 22 are determined, and the correction amount for smearing correction of the charge signal that is outputted from the image sensor 22 is varied based upon the operational conditions of the image sensor 22 that have thus been determined. These operational conditions of the image sensor 22 may be whether or not the signal from the image sensor is being used for a monitor image, whether or not the amount of light that is incident upon the image sensor 22 is being limited by the ND filter 20, whether or not the frequency of the clock signal that is being supplied to the image sensor 22 is high or low, whether the shutter release button has already been half pressed or not, or the like. It would be acceptable if only a single one of these conditions is considered, or if any appropriate combination of these conditions is considered. In this manner, it is possible to perform appropriate smearing correction according to the state of generation of smearing.

Variant Embodiment #1

With regard to the smearing correction coefficient that is used during monitor image acquisition, although it was arranged to utilize two separate values, i.e. the value y0 that is suitable for the open aperture state during clock signal reduction and the value y1 that is suitable for the small aperture state during clock signal reduction, alternatively, it would also be acceptable to use a common correction coefficient in both of these cases.

Variant Embodiment #2

With regard to the smearing correction coefficient after half press actuation, although it was arranged to utilize two separate values, i.e. the value y2 that is suitable for the open aperture state when the clock signal is normal and the value y3 that is suitable for the small aperture state when the clock signal is normal, alternatively, it would also be acceptable to use a common correction coefficient in both of these cases.

It should be understood that although, in the above explanation, the example has been explained of the use of an ND filter 20 as the means for limiting the amount of light that is incident into the camera, it would also be acceptable to arrange to utilize a turret type aperture or an iris type aperture.

The above described embodiments are examples, and various modifications can be made without departing from the scope of the invention.

What is claimed is:

1. An electronic camera, comprising:
an image sensor having pixel columns and a charge transfer unit that transfers an electric charge for each of the pixel columns;
a correction unit that obtains a leakage charge signal for each of the pixel columns and corrects an electric charge signal outputted from the charge transfer unit by subtracting an amount, resulting from multiplying a value of the leakage charge signal by a correction coefficient, from a value of the electric signal;
a control unit that controls the correction unit; and
an actuation member that generates a first signal that commands a start of photography using the image sensor, and a second signal before the start of photography is commanded, wherein
the control unit controls the correction unit to use a first correction coefficient before the second signal is generated and to use a second correction coefficient different from the first correction coefficient after the second signal is generated, when multiplying the value of the leakage charge signal.

2. An electronic camera according to claim 1, wherein the correction unit corrects the electric charge signal before the first signal is generated.

3. An electronic camera according to claim 1, further comprising:
a light reduction unit that is changed over between reducing and not reducing a light from a photographic subject that is conducted to the image sensor, wherein
the control unit controls the correction unit so as to make the correction coefficient be different when light reduction is being performed, and when light reduction is not being performed.

4. An electronic camera according to claim 1, wherein:
the actuation member is a shutter release button; and
the first signal is a signal that is generated by full press actuation of the shutter release button, and the second signal is a signal that is generated by half press actuation of the shutter release button.

5. An electronic camera according to claim 1, wherein the correction unit obtains the leakage charge signal by using a signal from an optical black portion of the image sensor.

6. An electronic camera according to claim 1, further comprising:
a signal supply unit that supplies a clock signal to be used to generate a drive signal for making the image sensor accumulate electric charge and for discharging the accumulated electric charge, and makes a frequency of the clock signal variable, wherein
the signal supply unit sets the frequency of the clock signal that is supplied before the second signal is generated to be different from the frequency of the clock signal that is supplied after the second signal is generated.

7. An electronic camera according to claim 6, wherein the signal supply unit sets the frequency of the clock signal that is supplied before the second signal is generated to be lower than the frequency of the clock signal that is supplied after the second signal is generated.

8. An electronic camera comprising:
an image sensor having pixel columns and a charge transfer unit that transfers an electric charge for each of the pixel columns;
a correction unit that obtains a leakage charge signal for each of the pixel columns and corrects an electric charge signal outputted from the charge transfer unit by subtracting an amount, resulting from multiplying a value of the leakage charge signal by a correction coefficient, from a value of the electric charge signal;
a signal supply unit that supplies a clock signal to be used to generate a drive signal for making the image sensor accumulate electric charge and for discharging the accumulated electric charge, and makes a frequency of the clock signal variable;
a control unit that controls the correction unit so as to make the correction coefficient vary according to the frequency of the clock signal supplied by the signal supply unit, wherein
the control unit controls the correction unit to use a first correction coefficient if the clock signal has a first frequency and to use a second correction coefficient different from the first correction coefficient if the clock signal has a second frequency different from the first frequency, when multiplying the value of the leakage charge signal.

9. An electronic camera according to claim 8, further comprising:
an actuation member that generates a first signal that commands a start of photography, and a second signal before the start of photography start is commanded, wherein
the signal supply unit sets the frequency of the clock signal that is supplied before the second signal is generated to be lower than the frequency of the clock signal that is supplied after the second signal is generated.

10. An electronic camera according to claim 9, wherein:
the actuation member is a shutter release button; and
the first signal is a signal that is generated by full press actuation of the shutter release button, and the second signal is a signal that is generated by half press actuation of the shutter release button.

11. An electronic camera according to claim 8, further comprising:
a light reduction unit that is changed over between reducing and not reducing a light from a photographic subject that is conducted to the image sensor, wherein
the control unit controls the correction unit so as to make the correction coefficient be different when light reduction is being performed, and when light reduction is not being performed.

12. An electronic camera according to claim 11, wherein the light reduction unit is controlled so as to set a threshold value for brightness at which changeover is performed from not performing light reduction to performing light reduction when the frequency of the clock signal supplied by the signal supply unit is low, to be lower than a threshold value for brightness at which changeover is performed from not performing light reduction to performing light reduction when the frequency of the clock signal supplied by the signal supply unit is high.

13. A smearing correction method with an electronic camera, comprising:
obtaining an electric charge signal that is outputted from an image sensor and is used for displaying a monitor image upon a display unit that is provided to the electronic camera;
determining whether or not a shutter release button has already been half press actuated;
subtracting a first smearing correction amount from a value of the obtained electric charge signal and using the electric charge signal having been subtracted the first smearing correction amount for displaying the monitor image, when determining that the shutter release button has not been half press actuated; and
subtracting a second smearing correction amount, which is different from the first smearing correction amount, from a value of the obtained electric charge signal and using the electric charge signal having been subtracted the second smearing correction amount for displaying the monitor image, when determining that the shutter release button has already been half press actuated.

14. A smearing correction method with an electronic camera according to claim 13, wherein:
a correction amount for smearing correction is obtained based on a leakage charge signal of the image sensor; and
a correction coefficient by which the correction amount for smearing correction is to be multiplied varies to obtain the first smearing correction amount and the second smearing correction amount.

15. A smearing correction method with an electronic camera according to claim 14, wherein:
the correction amount for smearing correction is obtained by using a signal from an optical black portion of the image sensor.

* * * * *